Figure 1:
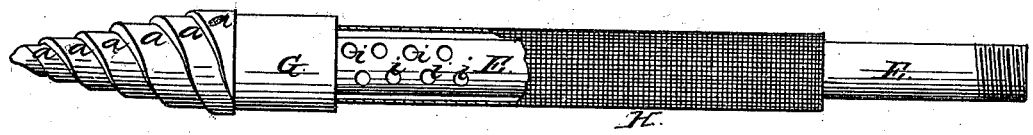
Figure 2:
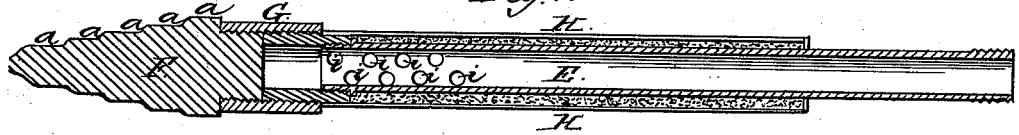

D. Baker,
Well Tubing.
N° 81,581.        Patented Sep.1, 1868.

Witnesses:

Inventor:
David Baker

United States Patent Office.

DAVID BAKER, OF BOSTON, MASSACHUSETTS.

*Letters Patent No. 81,581, dated September 1, 1868.*

IMPROVEMENT IN WELL-TUBES.

*The Schedule referred to in these Letters Patent and making part of the same.*

TO ALL WHOM IT MAY CONCERN:

Be it known that I, DAVID BAKER, of Boston, in the county of Suffolk, and in the State of Massachusetts, have invented new and useful Improvements in Well-Tubes; and do hereby declare that the following is a full, clear, and exact description thereof, reference being had to the accompanying drawings, and to the letters of reference marked thereon.

The nature of my invention consists in the construction of the point or screw at the end of the well-tube to facilitate its passage down into the earth, and in providing the tube with a screen or strainer for the purpose of increasing the flow of water through the same by means of an open chamber, and by having the holes or openings at the bottom of the tube.

To enable others skilled in the art to make and use my invention, I will proceed to describe its construction and operation.

In the annexed drawings, forming part of this specification, E represents a well-tube provided with a point or screw, F, which is connected with the tube by means of the coupling G. The point or screw F is to be made of iron, steel, or other suitable material, and so constructed that its sides $a\ a$ are perpendicular when the tube is inserted in the ground, and also parallel with each other, and forms a spiral inclined plane, with perpendicular sides and curved or square shoulders.

The construction of the point or screw F with perpendicular sides facilitates its passage down into the earth, as it throws the earth off in right angles from it, and not down, thus leaving the point of the screw free to penetrate further with comparative ease as it is turned, and the screw will not be so readily clogged up or jammed with any hard substance that may be in the earth.

The diameter of the upper end of the point or screw F should be a trifle larger than that of the coupling G, to which the point should be securely fastened by means of a screw or in any other suitable and efficient manner. The coupling G should be large enough to extend beyond and form a guard for the strainer or screen H, which is put over the holes on the tube, and may rest on the coupling or not, as may be desired, and thereby protecting the screen H from being torn by the rough earth on its passage down.

The strainer or screen H is made of wire or any other suitable material, and its edges are dove-tailed and soldered together, so that when it is down in the ground, and the water and earthy matter press on all sides, the strain on the screen cannot cause it to give or break. The diameter of the strainer or screen H should be so much larger than the diameter of the tube E that the chamber or space formed between the screen and tube will hold about as much water as the same length of the tube. The strainer may be made of any height, to extend above the holes $i\ i$ on the tube, as may be desired, but there must always be enough holes in the tube to allow as much water to enter as will fill the bore of the tube.

When the well is to be sunk, the chamber or space between the tube E and the strainer or screen H, as also the tube to the same height as the strainer, is filled with fine sifted sand or any other suitable material. When the tube has been sunk to the depth desired, the sand in the tube is pumped out, the sand in the chamber will pass through the holes $i\ i$ into the tube and also pumped out. The pressure of the water on all sides of the strainer will prevent it from bending, but hold it in its proper shape and position. The water now entering on all sides of the strainer H, and passing through the holes $i\ i$ into the tube E, will give a steady and increased flow of water. The strainer, when put on the tube, is fastened both at the top and bottom. At the bottom it may be fastened either to the tube or coupling, whichever may be desired.

The holes or openings $i\ i$ on the tube should be at the bottom thereof, as by such an arrangement this part is always full of water when the strainer is of suitable length and properly immersed, thereby avoiding the necessity of pumping air and foam, which is always the case when the water is allowed to get below the holes.

Having thus fully described my invention, what I claim as new, and desire to secure by Letters Patent, is—

1. A conical point, F, formed with perpendicular sides, and with shoulders between, the apex being formed with one or more drill-edges, the sides $a$ being elongated more or less, whereby the earth may be forced at right angles from said point in penetrating the ground, all substantially as shown and described.

2. The combination of the interior perforated tube A and the exterior screen H, when a chamber is formed between said tube and strainer, substantially as and for the purposes set forth.

3. The arrangement of the point F in combination with the tube E and holes therein, strainer or screen H, and the chamber or space formed between the strainer and tube, arranged and operating substantially as and for the purposes herein set forth.

In testimony that I claim the foregoing, I have hereunto set my hand, this 25th day of April, 1868.

DAVID BAKER.

Witnesses:
    LEOPOLD EVERT,
    A. N. MARR.